Sept. 7, 1937.   C. R. HANNA ET AL   2,092,064
TRANSLATING DEVICE
Filed Nov. 13, 1929   3 Sheets-Sheet 1

INVENTORS
Clinton R. Hanna &
Emil H. Greibach
BY
ATTORNEY

Sept. 7, 1937. C. R. HANNA ET AL 2,092,064
TRANSLATING DEVICE
Filed Nov. 13, 1929 3 Sheets-Sheet 2
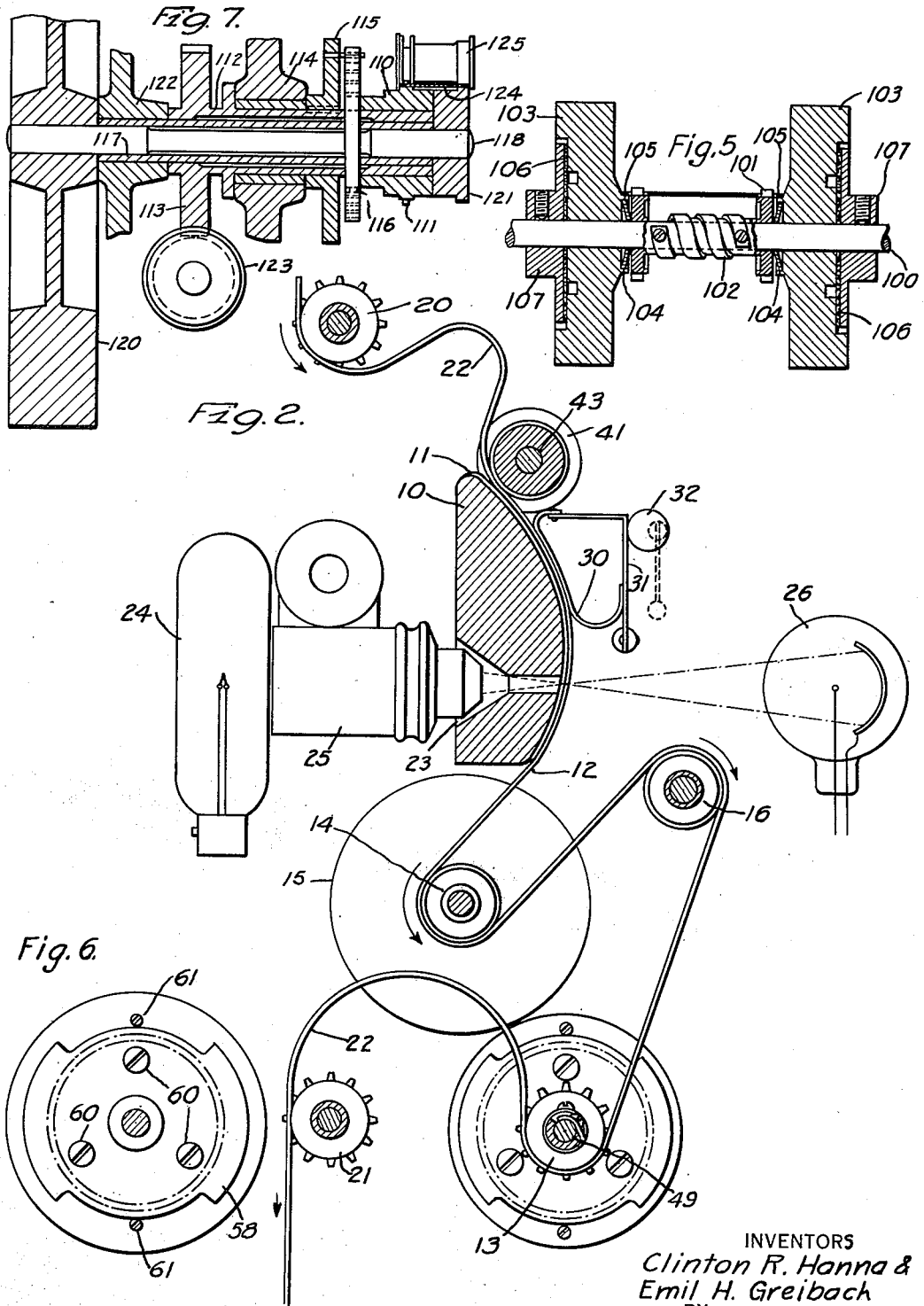
INVENTORS
Clinton R. Hanna &
Emil H. Greibach
BY Sept. 7, 1937.   C. R. HANNA ET AL   2,092,064
TRANSLATING DEVICE
Filed Nov. 13, 1929   3 Sheets-Sheet 3
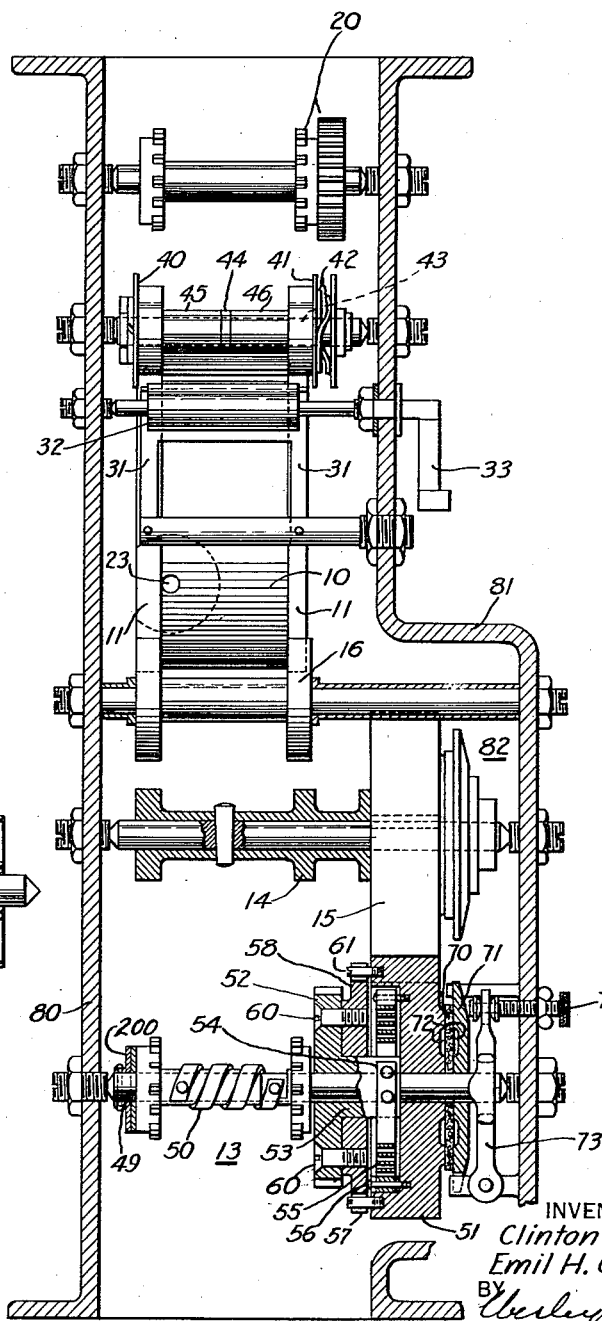
INVENTORS
Clinton R. Hanna
Emil H. Greibach
BY
ATTORNEY Patented Sept. 7, 1937

2,092,064

UNITED STATES PATENT OFFICE 2,092,064

TRANSLATING DEVICE

Clinton R. Hanna, Pittsburgh, Pa., and Emil H. Greibach, New York, N. Y., assignors to Westinghouse Electric and Manufacturing Company, a corporation of Pennsylvania Application November 13, 1929, Serial No. 406,847

24 Claims. (Cl. 271—2.3)

Our invention relates to translating devices and, although not restricted thereto, it has particular relation to devices for making photographic sound-records and to analogous devices for translating such records into electric-current fluctuations representative thereof.

As is well known to those skilled in the art to which our invention pertains, a vast amount of inventive effort has been spent in bringing motion-picture apparatus, per se, to its present high state of perfection. Only a relatively small amount of attention has been paid, however, to the development of satisfactory devices for the simultaneous recording and reproduction of sound and pictures and, in the majority of instances, such effort has been directed toward the designing of unitary machines rather than toward the adaptation of existing motion-picture apparatus to that purpose.

As a consequence, combined sound-picture machines have, as heretofore constructed, been relatively unsatisfactory, insofar as the sound-translating portions thereof are concerned, on account of the difficulty of providing means for securing an absolutely constant film-speed at the point where the sound record is made or, during the reproducing process, where it influences a pick-up device, such as a photoelectric cell, an electro-magnet, a phonographic sound box or the like.

It is, accordingly, an object of our invention to provide means whereby a film may be caused to advance through a sound-translating device at uniform velocity.

Another object of our invention is to provide a unitary device for imparting motion to a linear film and, at the same time, for preventing variations in the velocity of the film.

Another object of our invention is to provide a self-contained sound-reproducer unit capable of being added to a motion-picture projector without interfering with the mechanism thereof.

Another object of our invention is to provide, in a sound-reproducer unit of the type referred to, means whereby the passage of a film therethrough is not appreciably influenced by forces acting on the said film in the picture-projector.

Another object of our invention is to provide means whereby a film, carrying a photographic sound-record or a linear sound-record of any type, shall be constrained to move at a constant speed past a device adapted to translate the said record into audible sounds.

Another, and more specific, object of our invention is to provide means that shall prevent variations in velocity from being imparted to a linear sound-record from a driving-sprocket associated therewith.

Motion-picture apparatus, constructed according to our invention, preferably, comprises means for imparting motion to a film, a gate or an analogous device through which the film passes at the translation point, and inertia means associated with the film-advancing means whereby the film is prevented from moving unevenly. The film-advancing means, preferably, is constituted by a sprocket wheel having negligible inertia, or, at least, by a wheel having a mass that is much less than the mass of a fly-wheel roller which constitutes the inertia means.

The means utilized for conveying power to the sprocket wheel preferably comprises a constant-speed shaft, to which the said sprocket wheel is connected, through a resilient device, such as a coiled spring.

The novel features that we consider characteristic of our invention are set forth with particularity in the appended claims. The invention itself, however, both as to its organization and its method of operation, together with additional objects and advantages thereof, will best be understood from the following description of certain specific embodiments, when read in connection with the accompanying drawings, in which:

Fig. 2 is a schematic view, in elevation, of the essential elements constituting a sound-reproducer comprising a preferred emodiment of our invention.

Fig. 3 is an end view, partly in cross section, a part of the apparatus illustrated in Fig. 1.

Figs. 4 and 5 are sectional views of film-driving devices comprising further modifications of our invention.

Fig. 6 is a view of one of the details of the film-driving devices shown in Figs. 2 and 3.

Fig. 7 is a sectional view of a film-driving device comprising another modification of our invention particularly advantageous in apparatus adapted to handle very narrow films.

Figure 1:
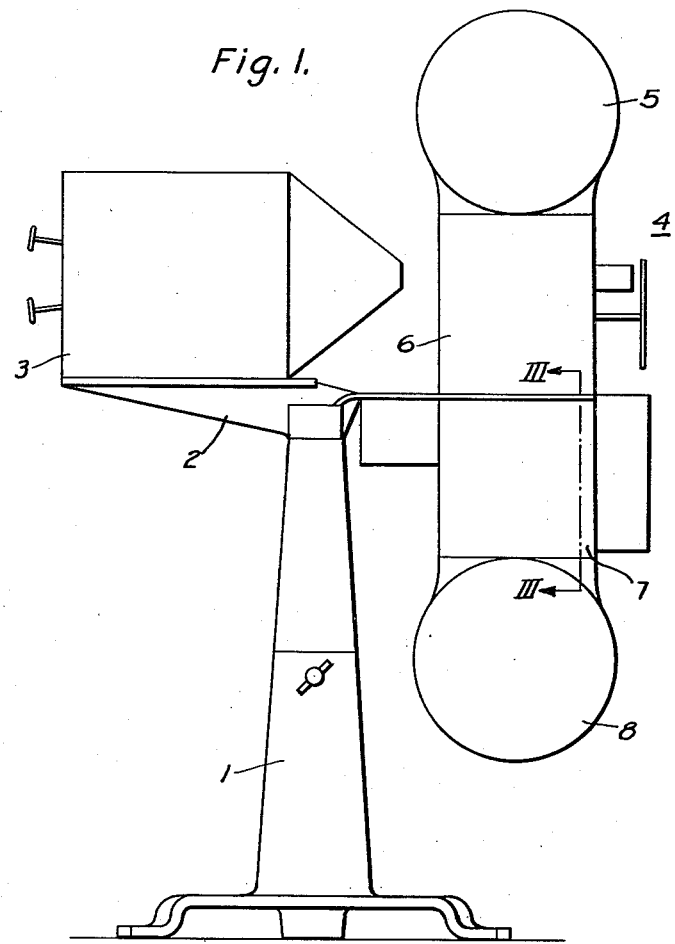
Figure 1 is a view, in elevation, of a conventional motion-picture projector modified by the interposition therein, between certain of the elements thereof, of a removable housing, in which is disposed means, comprising a preferred embodiment of our invention, for translating a photographic-sound record into electric-current fluctuations.

The apparatus shown in Fig. 1 comprises a standard 1, to the upper end of which is affixed a base plate 2. A lamp housing 3 is supported on one end of the base plate, and a motion-picture projector 4 is supported on the other end thereof.

The projector comprises an upper film-magazine 5, an upper housing 6, containing the essential elements of a motion-picture projector, such as are well known to those skilled in the art, a lower housing 7, in which is disposed apparatus constructed according to our invention and adapted to translate a photographic sound-record into electric current pulsations, and a lower film-magazine 8.

The lower housing 7 is preferably so constructed as to be readily removable in order that it may be replaced by another housing in the event that any of the apparatus contained therein breaks or gets out of order during service. The projector may also, if constructed according to our invention, be utilized for pictures alone by merely removing the lower housing 7 and by reconnecting the lower film magazine to the upper housing 6 to constitute a conventional motion-picture projector.

The projectors we have preferably utilized for modifications, according to our invention, are those known to the trade as "Simplex" and "Motiograph" since, in the said projectors, the lower film magazine may readily be removed to provide for the interposition of the auxiliary housing containing the sound-reproducing apparatus.

Our invention, however, is not to be considered as being limited in its application to projectors of the types named, since it lies within the spirit thereof to modify any commercial projector by the addition thereto of an extra sound-reproduction element or to originally construct a motion-picture projector as a plurality of separable units, in a manner somewhat analogous to the manner in which the well known sectional bookcases are made.

The apparatus disposed in the housing 7, and illustrated in Figs. 2 and 3, comprises a curved film-gate 10, having raised marginal tracks 11 over which a film 12 may be drawn by means of a sprocket-wheel 13 which rotates at a constant speed. In its travel between the film-gate and the sprocket-wheel, the film passes around an idler-roller 14, to which is affixed a fly-wheel 15, and also around a second idler-roller 16.

The film is fed to the film-gate by a positively driven upper sprocket-wheel 20 and is fed to the lower film magazine by a lower hold-back sprocket-wheel 21. An important phase of our invention resides in the loops 22 which are maintained in the film between the constant-speed sprocket-wheel 13 and the lower hold-back sprocket-wheel 21, and between the sprocket-wheel 20 and the gate, in order to isolate the film, at the translation point, from vibrations introduced by the mechanism of the picture-projector.

An opening 23 extends through the film-gate closely adjacent to one of the raised tracks 11. A fixed light-source 24 is provided, rearwardly of the gate, and an optical system 25 is interposed between it and the opening in the gate for the purpose of focusing the light, as a fine line, upon the film transversely of the travel thereof.

A photo-electric cell 26 is disposed forwardly of the gate upon which cell the light, after passing through the film, falls to modulate the output current therefrom.

A certain amount of "drag" is applied to the film, as it passes over the film gate, by means of a resilient film shoe 30. The film shoe is mounted upon a plurality of vertical springs 31 which tend to keep the shoe out of engagement with the film. A rotatable cam 32, having an operating handle 33, is provided in order that the shoes may be urged toward the film and kept in contact therewith against the resilience of the mounting springs 31.

The film is guided over the film gate by a plurality of freely rotatable discs 40 and 41. The disc 40, nearest the opening 23 through the film gate, is prevented from moving transversely of the film, while the opposite disc 41 is resiliently held against the edge of the film by a small spring 42 and is permitted to move axially of a shaft 43 on which both discs are rotatably supported. A spacing washer 44 is interposed between the inner ends of a plurality of rotatable sleeves 45 and 46, to which the discs are severally affixed, in order that the resiliently-urged disc 42 shall not exert pressure upon a film of normal width.

The sprocket-wheel 13 is freely mounted upon a shaft 49 and is connected thereto through a resilient member, such as a spring 50. The shaft may be maintained rotating at a constant speed by the utilization of driving means therefor constructed according to the disclosure in the copending application of E. H. Greibach, Serial No. 317,682, filed November 6, 1928, and assigned to the Westinghouse Electric & Manufacturing Company.

The driving device comprises a fly-wheel 51 which is keyed or otherwise affixed to the shaft 49. A gear-wheel 52, having a flange 53, is loosely mounted on the shaft. The flange is provided with a flattened portion 54, to which is affixed one end of a spiral spring 55 that is disposed in a recess 56 formed in the face of the fly-wheel nearest the gear-wheel. The other end of the spring is affixed to the fly-wheel by means of a pin 56 which extends through a loop formed in the said end.

Rotary motion is transmitted to the gear 52 from a prime mover (not shown), which supplies power for the entire projector and which may be either an electric motor, a hand-operated crank, or the like, and, from the gear to the fly-wheel, through the spiral spring. The strain imposed on the device, when starting or stopping, is taken up by a plate 58, shown in detail in Fig. 6, affixed to the gear wheel by a plurality of screws 60, the peripheral portion of the plate being so shaped as to come into contact with a plurality of pins 61 carried by the fly-wheel when the spring is too tightly wound, or when the fly-wheel tends to overrun the gear.

In addition to the spiral spring interposed between the gear and the fly-wheel, a viscous braking or damping device is provided. The said damping device comprises a leather ring 70 that is held against one face of the fly-wheel by a movable plate 71. The plate and the surface of the fly-wheel against which the leather ring bears are severally provided with an annular channel 72, the channel in the plate being kept filled with oil through a tube (not shown) which connects therewith, and the channel in the fly-wheel being supplied with oil by seepage through the leather ring.

Pressure is applied to the plate by a pivoted member 73, a screw 74, bearing against the free end of the pivoted member, being provided for adjusting the pressure.

As disclosed in the aforementioned copending Greibach application, the driving assembly for the shaft is analogous to an electrical filter system, the spring 55 being equivalent to a shunt-connected capacitor, the fly-wheel 51 being equivalent to an inductor, and the viscous damping device 70 being analogous to an electrical resistor, the inductor and resistor being in series across the capacitor.

The shaft 49, therefore, rotates at as nearly a constant speed as can possibly be attained through mechanical movements and applies, through the spiral spring 55, a constant tension upon the film at the points where it is engaged by the teeth of the sprocket wheel 13.

Although, for purposes of convenience, we have illustrated the apparatus, constructed according to our invention, as being supported between a plurality of walls 80 and 81 of the housing 7, it is to be understood tthat the wall 80 is omitted, in an actual commercial device, in order to permit the film to be easily threaded around the rollers and sprocket-wheels and through the film gate.

In the operation of sound-reproducing apparatus constructed as described, if the space between the openings in the film is less than the pitch of the teeth on the sprocket-wheel, substantially all of the driving force is applied to the film at the point where the film leaves the constant-speed sprocket-wheel 13.

Each time, therefore, that a tooth leaves the film, the film tends to slip back slightly until the following tooth engages the next succeeding hole in the film. This slippage of the film would introduce vibratory forces which, if not prevented from reaching the translation point, would give rise to unpleasant variations in the reproduced sounds. Several attempts have previously been made to cure this condition after it has arisen. As examples of such attempts, attention is called to the patent to Poulsen 1,597,819 and to the patent Vogt et al. 1,713,726, each of which shows resilient idlers bearing on the film for the purpose of absorbing "tooth-ripples", so-called, or for compensating variations in the angular velocity of a film-advancing sprocket-wheel.

Our invention, however, is diametrically opposed to the invention disclosed in the said patents, it being one of the objects thereof to prevent vibrations from being imparted to the film rather than to eliminate them after they appear, as heretofore.

The apparatus illustrated in the drawings prevents the setting up of vibrations in the film, by reason of the fact that the resiliently connected sprocket-wheel 13 has a mass which is entirely negligible, in comparison with the mass of the fly-wheel 15, associated with the free-running roller 14 over which the film passes as it leaves the film gate. The irregular forces produced by the film engaging the sprocket-wheel, and by the disengagement of the film from the sprocket-wheel, cause the said wheel to move more rapidly than the fly-wheel or inertia member and, consequently, the said sprocket-wheel, under the influence of the constant-speed shaft 49, moves with a steady motion, plus an oscillatory motion, in just the right way to give substantially uniform motion to the film as it passes over the sound gate.

Although not so shown in the drawings, certain of the advantages of our invention may be had by utilizing a sprocket-wheel, the teeth of which have a certain amount of resiliency, instead of the resiliently driven sprocket-wheel 13.

Since a driving system, constructed as described herein, involves inertial and elastic members, we have found it advisable, in many instances, to add additional damping devices, at one or more points, to prevent free oscillations or undesirable mechanical resonances. The damping devices may take the form of a viscous friction disc 82 associated with the free running fly-wheel 15, as illustrated in Figure 3 of the drawings, or means, such as a viscous-brake 200 may be provided for damping the oscillatory movement of the resiliently connected sprocket wheel 13 with respect to the constant-speed shaft as shown or with respect to a stationary portion of the apparatus.

The spring 55 has the additional important function of smoothing out pulsations in the speed of the driving shaft 49, should they occur. In fact, if the natural period of the system constituted by the spring and the free-running fly-wheel 15 is made sufficiently low, it is unnecessary to provide a filter for maintaining the shaft rotating at uniform velocity.

When our invention is applied to a photographic sound-recording device, it may, advantageously, take either of the forms shown in Figs. 4 and 5.

The film-driving device illustrated in Fig. 4 comprises a constant-speed shaft 90 which conveys rotary motion, through a spiral spring 91, or an equivalent resilient device, to a sprocket wheel 92 that is freely mounted upon the said shaft. An inertia-member 93 is mounted on the sprocket-wheel and is free to rotate thereon. The inertia-member is provided with end portions 94 having a diameter slightly greater than the diameter of the cylindric portion of the sprocket wheel.

Although not apparent in the drawings, a film of oil is preferably maintained between the inertia-member and the sprocket-wheel to serve as a viscous damping medium.

The film, therefore, in its passage over the combined sprocket-wheel and inertia-member, rests upon the ends of the said inertia-member and is driven solely through the contact of the sprocket-wheel teeth therewith. Any variations in the film velocity, tending to be introduced by the sprocket teeth, therefore, are absorbed by the spring 91 and impeded by the inertia-member.

Under certain circumstances as, for example, where our invention is to be used in a camera wherein space is limited, it is impossible to provide a sufficiently large inertia-member. In such event, the spring connection between the sprocket-wheel and the shaft may be omitted although, by the omission thereof, many of the advantages of our invention are lost.

Instead of mounting the inertia-member directly upon the film-advancing sprocket, it lies within the scope of our invention to provide an assembly such as is shown in Figure 5.

The apparatus illustrated in Fig. 5 comprises a constant-speed shaft 100 having a film-pulling sprocket-wheel 101 rotatably mounted thereon. The shaft and the sprocket wheel are interconnected through a resilient member 102. A plurality of flywheels 103 are rotatably supported on the shaft, one at each end of the sprocket-wheel.

Each of the fly-wheels is provided with an inwardly projecting annular flange 104, slightly larger in diameter than the diameter of the sprocket-wheel, these flanges being adapted to support a film when driven by the sprocket.

The flanges are prevented from coming in contact with the ends of the sprocket-wheel by the interposition of cup-shape spring members 105.

Viscous damping-elements are provided for the fly-wheels, these elements being constituted by oil soaked leather discs 106, the pressure on each disc being provided by the spring members 105 acting, through the fly-wheels, against fixed circular abutment-members 107 individual thereto. Each of the abutment members is held tightly to the shaft and rotates therewith.

When our invention is applied to apparatus, such as motion picture cameras, projectors, or film-phonographs, wherein the film is very narrow, it is not feasible to drive the film by a sprocket-wheel having teeth at each end. This is particularly true if the film in addition to the picture-record, is to carry a photographic sound-record, since the space allotted to the sound record would be too greatly restricted by the presence of sprocket-holes in the edge of the film adjacent thereto.

Referring specifically to Fig. 7 of the drawings, a film-driving device especially adapted for handling narrow films comprises a sprocket-wheel 110, having a single row of teeth 111, that is rotatably mounted upon a bushing 112. The bushing 112 has a gear 113 affixed to one end thereof and is, in turn, rotatably supported in a bearing device 114.

A disc 115 is keyed or otherwise affixed to the bushing intermediate the bearing device 114 and the sprocket-wheel 110, the sprocket wheel being flexibly connected to the disc by means of a spiral spring 116 that is connected, at one end, to the disc 115 and, at the other end, to the sprocket.

A hollow bushing 117 extends through the bushing 112, carrying the gear, and a shaft 118, to one end of which is affixed a fly-wheel 120 and to the other end of which is fastened a smooth, film supporting roller 121, is rotatably supported therein. The hollow bushing is prevented from rotating by a fixed supporting device 122 in which it is frictionally held.

Power is supplied to the gear 113 from a worm-wheel 123 which is driven from any suitable point in the apparatus.

In the operation of the device shown in Fig. 7 a film 124 is held against the sprocket-wheel 110, at one edge, and against the smooth roller 121, at the other edge, by means of a pressure roller 125. The film is driven by the sprocket wheel and, in turn, drives the smooth roller and the fly-wheel 120. Tooth-ripples and variations in the speed of the film occasioned by changes in the angular velocity of the gear 113 are compensated by the inertia of the fly-wheel and the resilience of the film extending between the sprocket-wheel and the smooth roller.

The film-driving devices illustrated in Figs. 4 and 5 and 7 are not limited to motion-picture cameras, but may, obviously, be utilized in motion-picture projectors, film phonographs and analogous apparatus wherein constancy of film-velocity is desirable.

Although we have illustrated certain specific embodiments of our invention, many modifications thereof, such as, for example, the substitution of eddy-current or magnetic devices for the viscous damping devices illustrated, will be apparent to those skilled in the art to which it pertains. Our invention, therefore, is not to be limited except insofar as is necessitated by the prior art or by the spirit of the appended claims.

We claim as our invention:

1. In combination, means for resiliently driving a linear film, a gate through which said film may travel, and means interposed between said gate and said resilient driving means for impeding changes in the velocity of said film.

2. In a sound-translating device, means for driving a shaft at a constant angular velocity, a sprocket wheel resiliently connected to said shaft and adapted to apply traction to a linear film and means for impeding changes in the velocity of said film, said means having an intertia large in comparison with the inertia of said sprocket-wheel.

3. In combination, a shaft adapted to be rotated at a constant angular velocity, a gate adapted to support a linear film during its travel therethrough, a sprocket wheel for applying traction to said film, a fly-wheel so disposed as to be rotated by the movement of said film, and a resilient connection between said shaft and said sprocket-wheel, whereby forces generated by the engagement of the teeth of said sprocket wheel with the film as prevented from being transmitted to said film in its passage through said gate.

4. In combination, a pulley adapted to apply traction to a linear film, a fly-wheel so disposed as to be rotated by said film, and viscous damping means associated with said fly-wheel.

5. In combination, a sprocket-wheel having small mass and being adapted to apply traction to a linear film, a shaft, means for suppressing variations on the angular velocity of said shaft, a resilient connection between said sprocket-wheel and said shaft, and impedance means for minimizing changes in the velocity of a linear film when the said film is caused to advance by said sprocket-wheel.

6. In combination, a driven shaft, a sprocket-wheel to apply traction to a linear film coupled to said shaft to be rotated thereby, and means interposed between said sprocket-wheel and said shaft for absorbing fluctuations in the angular velocity of said shaft and ripples tending to be introduced by the teeth of said sprocket-wheel.

7. In a sound-translating system, means for driving a film at uniform velocity and means, comprising loop-maintaining devices, whereby untensioned loops are maintained in the film for isolating the film at said driving means from undesirable disturbances that would, otherwise, be transmitted through the film from other portions of the system.

8. In a film-handling apparatus a composite film-driving device including means for positively applying traction on one edge of a film and inertia means acted upon by the opposite edge of said film.

9. In a sound translating device, a resiliently-driven sprocket-wheel for applying traction to a linear film and means for impeding changes in the velocity of said film, said means including an inertia large in comparison with the inertia of said sprocket wheel, said inertia being normally mechanically independent of said sprocket wheel and being capable of mechanical coupling to said sprocket wheel only through said film-strip.

10. In sound translating apparatus a sprocket wheel of comparatively small inertia, a shaft, means, including a spring one terminal of which is secured to said shaft and the other terminal of which is secured to said sprocket wheel, for driving said sprocket wheel from said shaft and means for damping the motion of said sprocket wheel thereby to suppress the axial oscillation thereof that are introduced by said spring.

11. In film handling apparatus, a composite film-driving device comprising dentate means for engaging a film strip, means, including a shaft, for driving said dentate means, and an inertial roller coaxial with said dentate means rotatably supported on said shaft to be engaged by said film strip and rotated thereby.

12. In combination in film handling apparatus a sprocket-wheel for advancing a film, means for driving said sprocket-wheel, means to cooperate with said driving means and said sprocket-wheel to maintain the angular velocity of said sprocket-wheel uniform, and means to cooperate with said film and said sprocket-wheel for suppressing irregularities arising by reason of the coaction of said sprocket-wheel and said film.

13. In combination in film handling apparatus a sprocket-wheel for advancing a film, means for driving said sprocket-wheel, a mechanical filtering system to cooperate with said driving means and said sprocket-wheel to maintain the angular velocity of said sprocket-wheel uniform, and another mechanical filtering system to cooperate with said film and said sprocket-wheel for suppressing irregularities arising by reason of the coaction of said sprocket-wheel and said film.

14. In a sound projector having a film feed reel, sound record reproducing means, a take-up reel, and film driving means for feeding the film to the reproducing means; a film sprocket mounted on the projector beyond the reproducing means and arranged to pull the film past said means, another film sprocket mounted on the projector over which the film subsequently passes before reaching the take-up reel, the film being formed with a loop between said sprockets, and the last sprocket acting as a hold-back against irregularities in film tension due to the operation of the take-up reel, and means to drive said sprockets together with the first mentioned film driving means.

15. In sound-picture apparatus, the combination of a prime mover, means for advancing a film intermittently at one point, means for advancing the film uniformly at another point, and means coupling said prime mover to both said advancing means, said coupling means including a driving element and a driven element resiliently coupled thereto.

16. In sound-picture apparatus, the combination of a prime mover, means for advancing a film intermittently at one point, means for advancing the film uniformly at another point, and means coupling said prime mover to both said advancing means, said coupling means including a shaft and a gear resiliently coupled to said shaft.

17. In photo-acoustic apparatus of the type wherein the sound to be reproduced is impressed on a web, a feed reel having said web wound thereon, means for translating the sound record impressed on said web into an acoustic disturbance, means for advancing said web from said reel through said translating means, means for winding said web after it has been advanced through said translating means and means for insulating said winding means for said advancing means to prevent the irregularities in the motion of said web introduced by said winding means from being transmitted to the web in the region of said translating means.

18. In photo-acoustic apparatus of the type including means for supporting a web having a record of an acoustic disturbance impressed thereon, means for translating the record impressed on said web into an acoustic disturbance means for advancing said web from said supporting means through said translating means and means for winding said web after the record has been translated; means for insulating said winding means from said advancing means to prevent the transmission of irregularities in the motion of said web, introduced by said winding means, to the web in the region of said translating means, said insulating means comprising means for forming a loop in the web between said advancing means and said winding means.

19. In photo-acoustic apparatus of the type wherein a record of a sound disturbance is impressed on a web or a sound disturbance is reproduced from a record impressed on a web, means for translating sound disturbance into a disturbance to be impressed on a web or for translating a record impressed on a web into a sound disturbance, means for advancing said web through said translating means and means, to engage said web before it enters said translating means and after it is disengaged from said advancing means, for insulating the web moving through said translating means from the web actuated by the other elements of said apparatus to prevent the irregularities introduced by said elements from being transmitted to the portion moving in the region of said translating means.

20. In photo-acoustic apparatus of the type wherein a record of a sound disturbance is impressed on a web or a sound disturbance is reproduced from a record impressed on a web, means for translating sound disturbance into a disturbance to be impressed on a web or for translating a record impressed on a web into a sound disturbance, means for advancing said web through said translating means and means for forming and maintaining loops in said web before it enters said translating means and after it is disengaged from said advancing means, for insulating the web moving through said translating means from the web actuated by the other elements of said apparatus to prevent the irregularities introduced by said elements from being transmitted to the portion moving in the region of said translating means.

21. In photo-acoustic apparatus of the type wherein a record of a sound disturbance is impressed on a web or a sound disturbance is reproduced from a record impressed on a web, means for translating sound disturbance into a disturbance to be impressed on a web or for translating a record impressed on a web into a sound disturbance, means for advancing said web through said translating means and means for preventing the irregularities introduced by the other elements of the apparatus from being transmitted through the web to the portion moving in the region of said translating means.

22. In photo-acoustic apparatus of the type wherein a record of a sound disturbance is impressed on a web or a sound disturbance is reproduced from a record impressed on a web, means for translating sound disturbance into a disturbance to be impressed on a web or for translating a record impressed on a web into a sound disturbance, means resiliently driven for advancing said web through said translating means and means for preventing the irregularities introduced by the other elements of the apparatus from being transmitted through the web to the portion moving in the region of said translating means.

23. Apparatus according to claim 21 characterized by that the means for advancing the web through the translating means is provided with mechanical filtering means whereby the web is maintained in uniform motion as it passes through the translating means.

24. In photo-acoustic apparatus of the type wherein a record of a sound disturbance is impressed on a web or a sound disturbance is reproduced from a record impressed on a web, means for translating sound disturbance into a disturbance to be impressed on a web or for translating a record impressed on a web into a sound disturbance, means, including rotating dentate means having mechanical filtering means associated therewith, for advancing said web through said translating means and means for forming and maintaining loops in said web before it enters said translating means and after it is disengaged from said advancing means, for insulating the web moving through said translating means from the web actuated by the other elements of said apparatus to prevent the irregularities introduced by said elements from being transmitted to the portion moving in the region of said translating means.

CLINTON R. HANNA.
EMIL H. GREIBACH.